United States Patent [19]

De Brou et al.

[11] 3,930,052

[45] Dec. 30, 1975

[54] GELATIN COMPOSITIONS

[75] Inventors: Michel De Brou, Grimbergen; Claude Den Tandt, Wezembeek-Oppem, both of Belgium

[73] Assignee: PB Gelatines, Brussels, Belgium

[22] Filed: Jan. 10, 1973

[21] Appl. No.: 322,422

[30] Foreign Application Priority Data
Jan. 10, 1972  France .............................. 72.00582

[52] U.S. Cl. ................ 426/576; 426/565; 426/572; 426/590; 426/571
[51] Int. Cl.² .......................................... A23L 1/04
[58] Field of Search ........................... 426/168, 576

[56] References Cited
UNITED STATES PATENTS
2,834,683  5/1958  Corben et al. ..................... 426/168
3,595,675  7/1971  Ash et al. ............................ 426/168

FOREIGN PATENTS OR APPLICATIONS
1,072,768  6/1967  United Kingdom ................ 426/168

Primary Examiner—Jeanette M. Hunter
Attorney, Agent, or Firm—Millen, Raptes & White

[57] ABSTRACT

A cold-water-soluble gelatin composition containing:
a. an amorphous gelatin component having a particle size not exceeding 210 microns, and
b. a comestible component different from (a) and having the following particle size:
  i. not exceeding 500 microns, and
  ii. at least one part by weight of said comestible component per part by weight of gelatin in said composition having a particle size not exceeding the particle size of the gelatin component;
the proportion of (b) to (a) in the composition being sufficient to maintain the gelatin in the non-clumping form when the composition is dispersed in water having a temperature of 15°–25°C.

14 Claims, No Drawings

GELATIN COMPOSITIONS

BACKGROUND OF THE INVENTION

This invention relates to gelatin compositions which when treated with cold water do not tend to agglomerate and clump but rather dissolve smoothly.

It is well known that the dissolving of gelatin normally requires the use of hot water and often a pre-swelling in cold water during at least 15 minutes before heating, the solution being then cooled in order to obtain gelation. Such pre-swelling and heating steps are a nuisance in the domestic as well as in the industrial arts. For this reason, extensive research has been conducted for many years to attempt to obtain satisfactory cold-water soluble gelatins.

It is known that amorphous, molecularly dispersed, gelatin obtained by drying solutions of gelatin from the liquid state to the dry state without passing through a gelled phase exhibits a cold-water solubility better than that of gelatins dried through a gelled state and which have a crystalline form. However, as pointed out in U.S. Pat. No. 2,819,971, issued Jan. 14, 1958, col. 1, lines 26–33, such amorphous gels are encumbered by clumping and foaming problems attendant their use. It is also known from col. 1, lines 52–60 of the patent that the cold-water solubility of amorphous gelatin can be further improved by grinding, but that the aforementioned problems of clumping and foaming are aggravated because of the smaller particle size. U.S. Pat. No. 3,595,675 is also pertinent in this connection.

To attempt to cure the clumping and foaming problems, it has been proposed that the ground amorphous gelatin be coated with a dispersant such as lecithin, silicones, esters of polyhydric alcohols, fatty amides, cationic wetting agents, etc. However, the addition of these dispersants may present problems if the gelatin is to be employed in food preparations; and, furthermore, the coating requires an additional treatment with relatively expensive agents, which increases the cost of the gelatin.

Other methods have also been described to increase the cold-water solubility of the gelatin, these methods comprising the evaporation of gelatin solutions containing products such as saccharine, sucrose, sugar, glucose in relatively large proportions, the weight ratio additive/gelatin being of at least 1:1 but more often from 4 to 8 and even to 10:1. Other additives such as sodium chloride, edible acids (citric, tartric, malic, succinic, adipic or fumaric acid) have also been proposed for treating gelatin solutions before drying. It is evident, however, that these various processes cannot be generally employed in gelatin manufacture, for the additive has to be tailor made according to the subsequent use of the prepared gelatin; for example, sugared products are not suitable for the meat or cheese industry whereas salted products cannot be used for desserts.

It has also been proposed that cold-water soluble gelatins be prepared from finely ground dry gelatin and 2 to 10 parts of sugar but, in this case, the sugar used must have a particular fibrous structure to obtain satisfactory results.

Further background is found in U.S. Pat. No. 3,067,036, patented Dec. 4, 1962, British Pat. Nos. 1,034,685 published June 29, 1966, and 1,072,768 published Nov. 10, 1965, French application No. 2,012,559 published Mar. 20, 1970 and U.S. Pat. No. 1,735,356 issued Nov. 12, 1929.

SUMMARY OF THE INVENTION

A principle object of the invention is to provide improved gelatin compositions which dissolve smoothly in cold water and also methods of producing these compositions.

Particular objects are to provide specific types of gelatin compositions and processes for producing same, including but not limited to the types set forth in the working examples, e.g. desserts of the "Jello" type, mousse mixes, pie and tart filling mixes, quick freezing ice cream mixes, etc.

Upon further study of the remainder of the specification and appended claims, other objects and particular advantages of this invention will become apparent.

To obtain these objects there are provided gelatin compositions comprising an intimate mixture of:

a. amorphous gelatin component having a particle size such that essentially all, if not all, the gelatin particles have a size not exceeding about 210 microns, and b. a comestible component which is not said amorphous gelatin component (a), said comestible component having a particle size as follows:
  i. essentially all, if not all, the comestible component has a size not exceeding about 500 microns, and
  ii. at least one part by weight of said comestible component per part by weight of gelatin in the composition has a particle size not exceeding that of the gelatin component.

Without being bound by an explanation of the function of the comestible component, it appears to prevent coagulation of the gelatin particles when the composition is dissolved in cold water, thereby avoiding clumping as well as foaming. Thus, there should be sufficient concentration of comestible in the gelatin composition to maintain the gelatin in the dispersed form thereby preventing clumping.

The amorphous gelatin having a particle size not exceeding about 210 microns is preferably produced by evaporating a gelatin solution without passing through the gelled state, and then grinding and screening the resultant product. If the particle size of the gelatin exceeds about 210 microns, e.g. is about 250 microns, the resultant gel, if formed in cold water, e.g. about 15° C, is grainy or clumpy in nature. As for the possibility of a lower limit for the particle size of the gel, this is dictated by practicability rather than theory. In other words, whereas the lower limit of the gel hardly ever is below 40 microns according to present grinding techniques, the invention should also be successful if the gel were less than 40 microns, but as the gelatin particle size becomes lower, the tendency to agglomerate is increased.

The best results are obtained with an amorphous gelatin ground and screened so that all the particles have a size comprised between 74 and 150 microns or, in other words, with the fraction of particles passing through a 100 mesh screen and retained on a 200 mesh screen (ASTM). With a gelatin having particles passing through a 200 mesh screen, it is possible to obtain cold-water soluble compositions, but there are more risks of agglomeration.

It must be noted that the amorphous gelatin ground as hereabove defined is not totally cold-water soluble and is difficult to dissolve. However, this gelatin can be easily mixed with all the comestibles normally used in the most various types of gelatin-containing preparations containing from 1 to 50 percent and more specifically from 5 to 25 percent by weight of gelatin. Such mixtures are perfectly cold-water soluble without any formation of lumps and/or foam when the solid ingredients accompanying the gelatin meet the conditions of particle size specified and whatever the nature of these ingredients may be.

It has been found that, to obtain a good cold-water solubility, the contituents other than the gelatin must ensure a dispersion of the gelatin particles so as to separate these particles the one from the other while they are in contact with the dissolving liquid. It is always possible to obtain a satisfactory dispersion by employing solid comestibles having a very fine particle size. However, very fine particle size is not necessary and the man skilled in the art can adjust the particle size of the comestibles added to the gelatin within the above-defined limits according to the desired preparations and the final structure of the gel to be obtained. By "very fine" particle size of the comestibles is meant particles passing through a 200 mesh or even fines particles passing through a 325 mesh screen.

To illustrate the interaction of the particle size of proportions of comestibles, in a composition having a low content of gelatin of about 1 to 2 percent for instance, a quantity of solid comestibles having a particle size equal to or lower than that of the gelatin corresponding to once to twice the weight of the present gelatin is sufficient, the rest of the ingredients having if desired a larger particle size but remaining less than 500 microns. For higher contents of gelatin, about 10 percent or more, the minimum quantity of ingredients having a particle size equal or inferior to that of the gelatin must be from 2 to 5 times the weight of the gelatin according to the final structure of the desired gel. For example, in a jelly, the structure of which is very smooth, the amount of ingredients having a fine particle size must be larger than in less smooth preparations such as creams and the like.

The compositions according to the invention can contain as ingredients added to the gelatin the most various comestibles usually used in gelatin preparation. Examples of these comestibles include but are not limited to: sugars: glucose, sucrose, fructose, lactose, maltose, etc., proteins: albumins, plant proteins, milk proteins and the like. All the edible acids and/or their salts can also be added: citric, tartric, malic acids, lactates, acetates and others. The ingredients which can be utilized also comprise thickening, gellifying and/or stabilizing agents such as alginic acid and their salts, particularly sodium and calcium alginates, pectic acid and its salts, alkali metal carrageenates, agar-agar, locust-bean flour, guar gum, gum tragacanth, gum arabic, substituted celluloses such as carboxymethycellulose and its sodium salt, methylcellulose etc. There can also be added fillers to the gelatin such as, for example, microcrystalline cellulose, crude starches, silica gel etc . . . ., inorganic salts (sodium chloride, alkali metal carbonates, edible salts of phosphoric acid), anticaking agents such as colloidal silica, emulsifying agents as mono- and digly cerides. Most of these products are found in commerce in powder form or, in sufficiently fine particle size to allow their direct use in the cold-water soluble gelatin preparations.

The amount of water usually added to the gelatin compositions of the invention can vary within large limits, the preferred proportions being for example from 100 parts to 2500 parts by weight of water for 100 parts by weight of the gelatin compositions.

The gelatin used in the compositions according to the invention can be prepared from gelatin solutions or broths obtained by all conventional means — acid or alkaline process — from all the raw materials usually employed for the manufacture of commercial gelatins. Among the usual raw materials, there are included but not limited to bones from India, fresh degreased bones, cowhide, pigskin, waste from the leather industry, sinews, conyskins, etc.

Furthermore, the gelatin can be produced in various degrees of gel strength with any viscosity. For instance, compositions according to the invention can be obtained from gelatins chosen in a preferred range of gel strength from 0g Bloom to 350g Bloom in a wide range of viscosity comprised preferably between 1 mp and 100 mp in British Standard measure system.

The gel strength of a gelatin is a parameter generally used to characterize the cohesion of the gel obtained with a determined concentration of a given gelatin. This gel strength is measured by means of a gelometer Bloom according to a test defined in the British Standard 757 (1959) page 13. This test consists of measuring the weight in g necessary to sink a plunger having a given diameter to obtain a given displacement in a gel prepared from a solution containing 6.66 percent by weight of gelatin under specific conditions.

For preparing the gelatin to be used in compositions according to the invention, gelatin broths obtained by any convenient means are dried and the dry products are ground and screened. Drying is conducted by any known way so as to have the gelatin solutions brought from a liquid state to a solid state without passing through a gel phase. For this purpose different methods can be used such as drying in tunnel dryer effected at temperatures higher than the congealing point (temperature where the setting in a gel begins), drying by coacervation at high temperature, or spray drying. Preferably, drying is performed on a cylinder dryer by treating a gelatin solution maintained at a temperature higher than the congealing point. The concentrated solution is then passed to a drum provided with a heating surface where it is concentrated and dried without passing through the gelled state. The dried gelatin is then sent to a mill suitable for finely grinding the amorphous gelatin. For instance, an impact mill provided with a contra-selector such as the mill PPSR8 constructed by the firm L. Pallman (Zweibrucken) is perfectly suitable for the treatment of gelatins.

After grinding, the gelatin is screened by passing onto a screen, preferably a vibrating screen provided with a suitable system against clogging, the particle having a size higher than 210 microns being recycled to the mill.

For the manufacture of commercial products, the screened gelatin is thoroughly mixed with the other ingredients of the desired composition, the solid ingredients of this composition having the herein prescribed particle size. At the time of utilization, the commercial products can be dispersed at low temperature, for example with tap water or even with an aqueous liquid notably colder such as milk just coming from a refrigerator. Whereas the compositions of the invention can be dispersed in an aqueous medium at from the freezing point to the boiling point of the aqueous medium, the preferred temperature of the aqueous media is below 25° C, especially 5°–25°, and in particular, 15°–25° C.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

A broth containing 15 percent by weight of gelatin prepared from osseine by the acid process and then clarified, is spraydried in a tower of 7m in height and 2m in diameter. The broth is sprayed into the top of the tower by means of a nozzle. A dried-air stream having a temperature of about 130°C is introduced onto the lower part of the tower.

A powder having an average residual moisture of 5 percent is withdrawn from the lower part of the tower. This powder is sent to a grinding-screening installation comprising an impact mill with contra-selector and a vibrating screen. The final product has a particle size such that 100 percent of the particles pass through the 70 mesh screen, that is to say, have a size lower than 210 microns.

With this gelatin having a gel strength of 50g Bloom and a viscosity of 16 mp, the following mixture is prepared:

| | |
|---|---|
| gelatin | 28g |
| lyophylized lean white cheese passing through a 50 mesh screen | 196.5g |
| sugar passing through a 70 mesh screen | 65.6g |

This mixture is packed in a small bag. At the time of utilization, the contents of the small bag are poured in 0.750 l. of tap water, and the mixture is whipped with the optional addition of a fresh egg to improve lightness. An aqueous mixture is obtained without clumping or foaming, and when it is homogeneous, it is poured in a specially provided base made of biscuit with a provisional cardboard side. After one hour in a refrigerator, a smooth paste is obtained and the cardboard side can be removed. The instantaneous cheese tart is then ready.

EXAMPLE 2

The raw material is an industrial solution of pigskin acid gelatin containing 15 percent by weight of gelatin and having a gel strength of 270g Bloom. This solution is dried in the form of a thin film on a drum dryer having its surface maintained at 140° C and provided with a knife to scrape the dried gelatin layer in the form of a web. This gelatin containing an average moisture of 5 percent is ground in coarse flakes in a cutting screw from where it passes into a grinding-screening installation as described in the preceding example, provided with 100 and 200 mesh screens.

The so-obtained gelatin has a particle size between 74 and 150 microns, a gel strength of 270g Bloom and a viscosity of 50 mp.

This gelatin is used for the preparation of a dry mixture containing:

| | |
|---|---|
| gelatin | 5g |
| citric acid | 0.8g |
| sodium citrate | 0.26g |
| powdered sugar(passing through a 250 mesh screen) | 35.22g |
| flavorings | s.q. |
| coloring | s.q. |

This dry mixture is put in a small bag where it can be kept during several months. For use, the contents of the small bag are poured under stirring in 0.250l of tap water (temperature 18°C). All the powder is rapidly dissolved. The preparation is then poured in a mold which is placed in a refrigerator at + 5°C. After 35 minutes, a perfectly limpid jelly is obtained.

EXAMPLE 3

The gelatin is prepared as in example 1 but has a gel strength of 220g Bloom, a viscosity of 30 mp and a particle size such that 100 percent pass through a 100 mesh screen (lower than 150 microns).

With this gelatin, the following dry mixture is prepared:

| | |
|---|---|
| gelatin | 2.5g |
| powdered sugar | 15g |
| sodium pyrophosphate | 0.5g |
| cocoa powder | 5g |
| egg flavoring | s.q. |

For use, the mixture is added with light whipping to 0.1 liter of milk coming from a refrigerator (+5°C). After 3 minutes of stirring, the mixture is poured into a mold which is put into a refrigerator for 20 minutes: an excellent unctuous dessert is then obtained.

To the above dry mixture, spray-dried egg albumen can be added. After mixing with cold milk and whipping, a mousse is obtained which is stabilized by refrigeration after about 20 minutes.

EXAMPLE 4

A skin-gelatin broth obtained by the acid process and not clarified is treated as in example 2, but the screening is carried out so that 100 percent of the product passes through a 140 mesh screen (particles lower than 105 microns).

A dry mixture is prepared with this gelatin having the following composition:

| | |
|---|---|
| milk powder (26% fat) | 322g |
| gelatin | 46g |
| soluble starch | 138g |
| guar gum | 11.04g |
| lyophilized egg albumen | 22.9g |
| powdered sugar | 360g |
| yellow coloring vanilla egg flavoring | s.q. |

For use, this dry mixture is poured into 1 liter of tap water (18°C) under agitation. The mixture becomes rapidly homogeneous without clumping. After remaining 20 minutes in a refrigerator, a cream is obtained which can be eaten as such or after incorporating previously whipped fresh cream.

EXAMPLE 5

An ossein gelatin obtained by the lime process, cleared and not very colored is dried as described in example 2, then screened through a 200 mesh screen. The oversize (60 percent of the gelatin sent to the screening) is recycled to grinding.

The gelatin has a particle size lower than 74 microns, a gel strength of 240g Bloom and a viscosity of 45 mp. From this gelatin a dry mixture is prepared having the following composition:

| | |
|---|---|
| gelatin | 30g |
| glucose | 90g |
| sodium chloride | 5g |

-continued

| | |
|---|---|
| sodium glutamate | 5g |
| citric acid | 3g |
| sodium citrate | 1g |
| pepper flavoring } | |
| meat extract } | s.q. |

The glucose used is a powdered product sold under the name "Glucodry" by the Belgian firm Les Glucoseries Reunies.

This mixture is bagged and can be kept for several months. For use, it is mixed without beating with 1 liter of cold water and complete dissolving is rapidly obtained without any formation of lumps or foam.

This solution can be used for covering different products such as meats, fishes, vegetables etc.. After remaining 35 minutes in a refrigerator at +5°C, a limpid, gold-colored jelly is obtained.

EXAMPLE 6

A gelatin broth obtained by the acid process from pig-skin is dried, ground and screened as in example 2 so that its particle size is between 74 and 100 microns. This gelatin which has a gel strength of 150g Bloom and a viscosity of 25mp is used for preparing a dry mixture having the following composition:

| | |
|---|---|
| gelatin | 4g |
| sucrose | 52g |
| dextrose | 12g |
| low-fat powdered milk | 45g |
| polyglyceryl stearate | 1.5g |
| guar gum | 0.5g |

This mixture in which the gelatin plays the part of stabilizing and controlling agent for water crystallization is used for preparing household quick freezing ice cream. This mixture is added to 2.280 liters of milk at room temperature and then mixed with a whip. After dispersion the preparation is placed in a refrigerator at −5°C for some hours before being eaten.

Sucrose and dextrose are powdered products normally found in commerce.

EXAMPLE 7

The following formulation is used for preparing creams to fill eclairs, cream puffs and the like or to fill tarts (parts by weight):

| | |
|---|---|
| gelatin | 10 |
| modified starch | 170 |
| lean powdered milk | 210 |
| powdered sugar | 220 |
| dextrose | 100 |
| yellow coloring | 0.15 |
| vanilla flavoring | 0.3 |

The gelatin used is obtained according to the process described in example 2 and has a particle size between 74 and 140 microns. Its gel strength is chosen according to the desired final texture between 100 and 200g Bloom.

For use, the dry preparation having the above composition is poured into water at room temperature (710g in 2 liters) and mixed with a whip for 3 minutes. After 30 minutes at +5°C, the thickened preparation is smooth before being used.

EXAMPLE 8

A dry mixture to obtain an instantaneous milk cream for covering fruit has the following composition in parts by weight:

| | |
|---|---|
| gelatin | 10 |
| vegafoam D | 10 |
| powdered sugar | 350 |
| modified starch | 70 |
| milk powder | 350 |
| flavorings | s.q. |

The gelatin obtained as in example 2 has a particle size less than 150 microns and its gel strength is 200g Bloom.

This powder is added to water at room temperature (790g in 1 liter) and mixed with a whip. After one hour to +5°C, a gelled preparation is ready.

EXAMPLE 9

A pig-skin gelatin solution obtained by the lime process is treated as described in example 1. The gelatin having a particle size less than 210 microns, a gel strength between 80 to 100g Bloom and a viscosity of 30mp is used to stabilize fruit pulp in suspension in soft drinks.

EXAMPLE 10

A gelatin prepared as in example 2 having a particle size comprised between 74 and 150 microns and a gel strength of 240g Bloom is mixed to egg albumen in a quantity corresponding to 5% by weight. Desired flavorings are added, and by whipping the mixture at room temperature, a stable albumen foam is obtained without any cooking.

EXAMPLE 11

A chiffon can be prepared without any heating by using the following formulation:

| | |
|---|---|
| gelatin | 4.5g |
| powdered sugar | 65g |
| soluble starch | 10.5g |
| citric acid | 1.2g |
| sodium citrate | 0.2g |
| guar gum | 0.5g |
| yellow coloring | 1.5g |
| lemon powder flavorings | 0.6g |

The gelatin used is the same as described in example 10. For use, the above mixture is added to 0.240 liters of water at room temperature, then stirred in an electric mixer to obtain a foam. After 1 hour in a refrigerator at +5°C the dessert is ready. Its texture is stable, non-rubbery and aerated.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A cold-water-soluble gelatin composition consisting essentially of:

a. a particulate, spray dried, tunnel dried or drum dried amorphous gelatin component having particle size not exceeding 210 microns, said amorphous gelatin component having been prepared by evaporation of a gelatin solution without passing through the gelled state, then ground and screened, and b. a powdered, water-dispersible comestible component different from (a) and having the following particle size:

i. not exceeding 500 microns, and ii. at least one part by weight of said comestible component per part by weight of gelatin in said composition having a particle size not exceeding the particle size of the gelatin component;

the proportion of (b) to (a) in the composition being sufficient to maintain the gelatin in the non-clumping form when the composition is dispersed in water having a temperature of 15°–25°C.

2. A composition as defined by claim 1, said amorphous gelatin component being present in the composition in a concentration of 1–50 percent by weight.

3. A composition as defined by claim 1, said amorphous gelatin component being present in the composition in a concentration of 1–25 percent by weight.

4. A composition as defined by claim 1, wherein essentially all of said comestible component has a particle size not exceeding that of the amorphous gelatin component.

5. A composition as defined by claim 1 wherein said amorphous gelatin component is present in a concentration of less than 10% by weight of the composition, and wherein said comestible component having a particle size not exceeding the particle size of the amorphous gelatin component is present in concentration corresponding to 1 to 2 times by weight the quantity of the amorphous gelatin.

6. A composition as defined by claim 1 wherein said amorphous gelatin is present in a concentration of more than 10% be weight of the composition, and wherein said comestible component having a particle size not exceeding the particle size of the amorphous component is present in a concentration corresponding to 2 to 5 times by weight the quantity of the amorphous gelatin.

7. A composition as defined by claim 1, said gelatin having a particle size between 74 and 150 microns.

8. A composition as defined by claim 1, said comestible component comprising a major amount by weight of a member selected from the group consisting of a powdered sugar, a powdered milk and mixtures thereof.

9. A composition as defined by claim 8, wherein said member is a mixture of powdered sugar and powdered milk.

10. A composition as defined by claim 1, said comestible component comprising a major amount of a mixture of sucrose, dextrose and low-fat powdered milk.

11. A composition as defined by claim 1, wherein the amorphous gelatin is produced by drying on a drum dryer at above the congealing temperature.

12. A process for stabilizing a gelatin in an aqueous medium, said process comprising employing as said gelatin, an amorphous gelatin obtained by drying a gelatin solution from the liquid state to the solid state without passing through the gelled state and having a particle size not exceeding about 210 microns, and dispersing in said aqueous medium said gelatin simultaneously with, a solid powdered, water-dispersible comestible component different from the amorphous gelatin component and having the following particle size:

i. not exceeding 500 microns, and ii. at least one part by weight of said comestible component per part by weight of gelatin in said composition having a particle size not exceeding the particle size of the gelatin component;

the proportion of the comestible component to the amorphous gelatin component in the composition being sufficient to maintain the gelatin in the non-clumping form when the composition is dispersed in water having a temperature of 15°–25°C.

13. A process as defined by claim 12, wherein said process is conducted at 15°–25°C.

14. A process as defined by claim 12, further comprising the step of cooling the aqueous dispersion to produce a gel.

* * * * *